Aug. 4, 1942. A. N. ANDREWS 2,291,859
CAPLESS SELF SEALING FOUNTAIN PEN
Filed Aug. 12, 1940 2 Sheets-Sheet 2
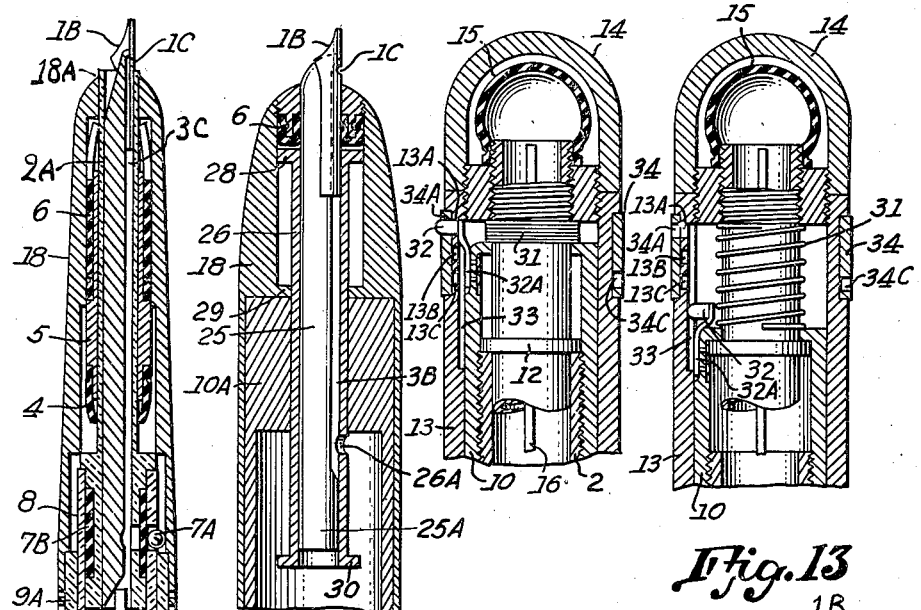
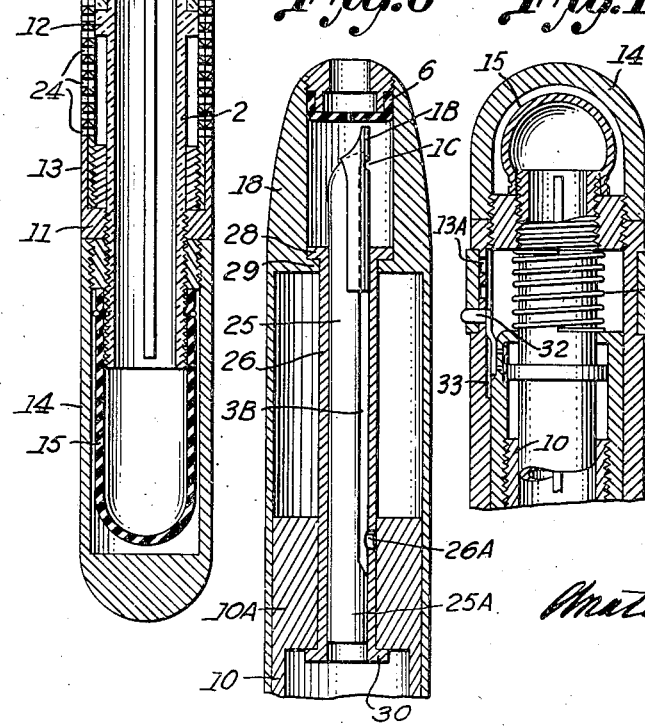
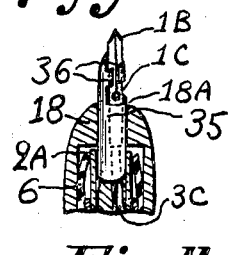
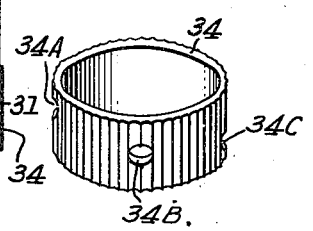
Inventor:
Anatol N. Andrews Patented Aug. 4, 1942

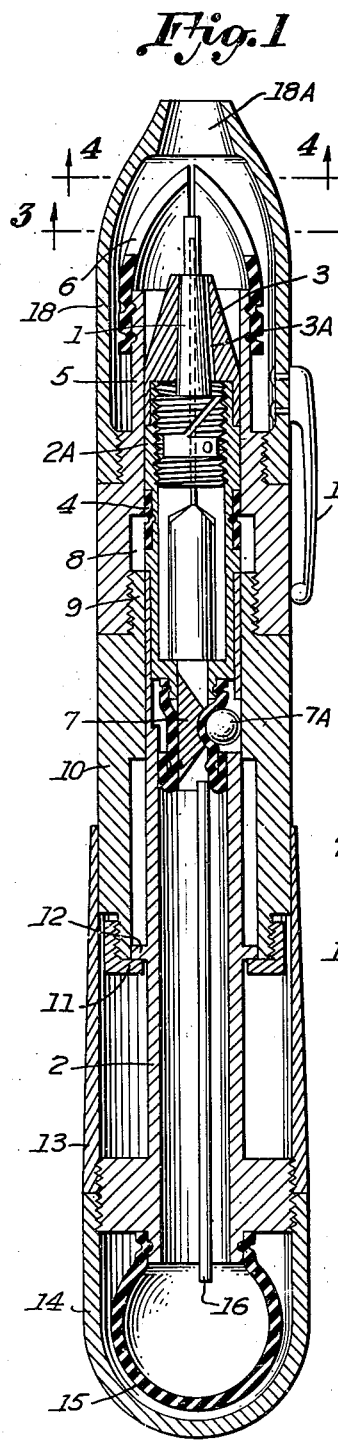

2,291,859

UNITED STATES PATENT OFFICE 2,291,859

CAPLESS SELF-SEALING FOUNTAIN PEN

Anatol N. Andrews, Los Angeles, Calif.

Application August 12, 1940, Serial No. 352,288

18 Claims. (Cl. 120—49)

This invention is a capless self-sealing fountain pen or similar article provided with improved means to cover a retractable nib and depress a valve in a pen duct and has for its objects to provide a fountain pen in which the nib may be secured to a retractable duct housing with a sideway extending shut-off valve, for instance, constructed under my United States Patent #2,098,528, and a slidable pen cover telescopically engaged thereover, and the inner wall of the cover having an elevation to allow room for valve release when the valve assumes dependent position within said elevation, and a projection adjacent to the elevation and adapted as means to depress the valve by sliding over the latter when nib is retracted; to wet retractable nib in a fountain pen by means based upon the principle of bodily contact with the pen nib, said means consisting of number of petals, or of solid puncture self-sealing body, of relatively soft, flexible and resilient material adapted to allow direct and frictional or dashing contact against the nib without damage to the latter, and secured within and with a slidable cover telescopically engaged over retractable duct housing with a nib therein, and arranged to form a closed roof over the nib when the latter is retracted and withdrawn therefrom; to compact distribution of a convertible roof over retractable and relatively cylindrical duct housing with a nib therein in a pen where said roof is secured to a slidable cover telescopically engaged over said duct housing and comprises four or more resilient petals which multitude is adapted to allow circularly equalized and balanced (for compactness) distribution of said petals around and against the wall of the duct housing when latter projects through said roof; to conceal operation of convertible roof for retractable nib in a pen where a slidable cover is telescopically engaged over a retractable duct housing with a nib therein, and a relatively small, stationary (permanent) opening in the upper end of the cover allows the nib and a section of the duct housing to pass therethrough when advanced, and longitudinally convertible roof is secured within and with the cover relatively far from the outer edges of the aforesaid opening to allow operation of convertible roof to remain relatively inconspicuous from outside; to insulate ink in the air duct from inner wall of slidable cover telescopically engaged over a retractable nib when latter is in advanced position in a pen having a longitudinal deck for a retractable pen section which deck is secured thereto over a length of the pen nib, feed duct, air vent and air duct, the latter projecting from the air vent to an opening from under the outer end of the deck which extends to a middle section of the nib, and, when said pen section is in advanced position (especially for filling the pen), the outer end of the deck extends together with the nib beyond open end of the cover to insulate the air vent and air duct (and ink that may pass therethrough) from the inner wall of the cover; to provide means allowing a retractable nib of regular type together with its mounting to pass through a relatively inconspicuous in size opening) for instance, 1/8"—or less—in diameter) in telescopically engaged slidable pen cover, which means reinforce the split length of the nib independently from the pen feed and the casing of the cover opening, and consist of a tubular neck of relatively hard material secured to the pen section and having relatively thin walls at one end thereof which is open and is of relatively small diameter to allow its passage through the opening in the cover, and a relatively flat and narrow nib-length including the split portion thereof mounted longitudinally in relatively diametrical position within and in relation to the relatively tubular walls of the outer end of the neck which walls are adapted to form grips against the side edges of the nib-length therebetween to reinforce the latter and contribute to hold the nib in described position. A feed duct is extended between the nib and the opposite wall of the neck, and the wall of the nib-length may be relatively thin to allow more room for the duct. The nib writing flexibility, relative firmness of the gripholds, nib extension beyond the neck, nib fragility, nib width—all are independent. When the main object is to lessen the nib-width as much as serviceably possible to allow narrower neck and smaller cover opening then to preserve practical and lasting firmness of such narrow nib it may become necessary to decrease its extension beyond the neck by securing the nib farther into the neck, in such case the air vent may be within the neck, the longitudinal duct formed over the feed duct from the air vent between the relatively flat nib-length and the relatively convex neck-wall may be adapted as the air duct, and the wall as the deck to insulate possible ink in the duct from inner walls of the cover when retractable pen section is advanced and a portion of the neck projects through the cover-opening.

Among other objects of this invention are: to provide means to depress the valve when only certain portion of the retractable nib is projected beyond the slidable cover; to release the valve gradually while the retractable nib is being projected beyond the slidable cover; to arrest the slidable cover in different dependent positions besides the position in which the nib is fully retracted; to neutralize certain arresting means adapted to seize the cover in one or more dependent positions and simultaneously set other similarly adapted arresting means to effect the seizure of the cover when latter reaches certain dependent position; to provide means to conceal break of lines formed by a slidable pen cover while the latter is telescopically engaged over the pen, and to secure said means to the middle section of the barrel and not to the end thereof.

Mechanical structures of all aforesaid means are fully described with other details in the following reference to the accompanying drawings.

On the drawings:

Figure 1 is a longitudinal sectional view of a fountain pen in closed position embodying principles of this invention with a stylus type of a pen nib, an air pipe in the ink container and a certain type of a shut-off mechanism;

Figure 2 is a longitudinal sectional view of the same fountain pen in open position;

Figure 3 is a fragmentary cross section taken on line 3 of Figure 1;

Figure 4 is a fragmentary cross section taken on line 4 of Figure 1;

Figure 5 is a fragmentary view of one end of a fountain pen embodying principles of this invention with a rubber sac walling an ink container and the same type of a shut-off mechanism;

Figure 6 is a longitudinal sectional view of a fountain pen in open position embodying principles of this invention with a regular type writing nib, and with the same type of a shut-off mechanism;

Figure 7 is a fragmentary view of one end of a fountain pen in open position embodying principles of this invention with a regular type writing nib, and with another type of a shut-off mechanism;

Figure 8 is a fragmentary view of the same end of the same fountain pen shown in Figure 7, and shows said pen in closed position;

Figure 9 is a fragmentary view of one end of a fountain pen embodying principles of this invention, with an arresting mechanism holding a pen barrel in one dependent position in relation to slidable pen cover;

Figure 10 is a fragmentary view of the same end of the same fountain pen illustrated in Figure 9, and shows the arresting mechanism released;

Figure 11 is an elevational view of a regulating ring for the arresting mechanism illustrated in Figures 9 and 10;

Figure 12 is a fragmentary view of the end of the pen illustrated in Figures 9 and 10, and shows the arresting mechanism holding the pen barrel in another dependent position through the medium of the regulating ring shown in Figure 11;

Figure 13 is a fragmentary view of a writing end of a fountain pen in open position embodying principles of this invention, with an elongated tubular neck adapted as mounting for a relatively narrow and flat nib of regular type, and shows the outer end of the neck extending together with the nib beyond an opening in the top of a slidable pen cover.

As shown on the drawings:

The fountain pen may comprise an elongated hollow barrel 2 (Figures 1, 2 and 6). Pushed into the end of barrel 2 is a pen section 2A wherein in overlapping relation are secured either a stylus type writing nib 1 with its regularly arranged feeding system (Figures 1 and 2), or a regular type nib 1B with its air vent 1C and the pen feed with feed duct 3C (Fig. 6). An air pipe 16 (Fig. 1) is mounted into the feed duct similar to 3C of Figure 6, and is extended within the ink container. A slidable pen cover 18 with a relatively small stationary opening 18A is movably secured over barrel 2 (Figures 1, 2 and 6) and has an elevation 8 and projection 9 or 9A and is in cooperating relation with nib 1 (Figures 1 and 2) or nib 1B (Fig. 6) and with a shut-off mechanism which may be a shut-off valve 7A and 7B (Figures 1, 2, 5 and 6) constructed as shown within the scope of my U. S. Patent #2,098,528, or another suitable type of a shut-off mechanism with a sideway extending shut-off valve, for instance, illustrated in Figures 7 and 8 and related to an ink container within the barrel 10 (Fig. 8) where nib 1B with a pen feed 25 are secured in relatively narrow casing 26 at one end of said barrel 10, and the casing 26 is movable longitudinally within neck 10A of barrel 10, and is limited in its movements by its holding ends 28 and 30. The end 28 is adapted to meet resistance of rubber cap 6 and catch 29 of cover 18, and the end 30 to meet resistance of inner end of neck 10A.

Feed 25 has a feed duct 3B from nib 1B towards the container within barrel 10. The inner end 25A of feed 25 is closed. The closed end 25A is adapted as a cork to block the casing 26 and feed duct 3B from the container within barrel 10 when said end 25A is moved upward as shown in Figure 8, and release the duct 3B to the container in the barrel 10 through opening 26A when moved backward as shown in Figure 7.

Aforementioned cooperating relation of cover 18 with nibs 1 and 1B and the shut-off mechanisms is based upon simultaneous and dependent actions of the members. While nibs 1 or 1B are retracting within cover 18 the shut-off mechanisms cause the blocking of ink flow through feed ducts (3C, 3B and opening 26A Fig. 1). The opposite movement would project the nibs and cause the shut-off mechanisms to release said ducts (Figures 2, 6 and 7).

In relation to Figures 1, 2 and 6 it is accomplished as follows. When cover 18 is pulled forward (Fig. 1) the nib 1 is completely withdrawn thereunder, simultaneously the projection 9 compresses button 7A of the shut-off valve. When cover 18 is pulled in opposite direction the nibs 1 or 1B would project through opening 18A, simultaneously the button 7A is released by assuming dependent position within elevation 8 which, in turn, causes the opening of duct 3C and free passage of ink therethrough from the container to nibs 1 or 1B (Figures 2 and 6).

In relation to Figure 6, tubular cylinder 9A is secured firmly therein within cover 18 and is adapted as the projection similar to the projection 9 or barrel 10 in Figures 1 and 2.

In Figures 1 and 2 the slidable cover consists of cover 18 secured to tubular housing 5 which, in turn, is secured to another tubular housing 10, and within one end of the latter there is an inner groove to allow convexity 12 of pen barrel 2 a longitudinal slide therewithin limited at one end of the groove by the edge of advanced portion in barrel 10, and at the other end by hold 11 screwed over the sunken end of barrel 10. Due to interrelated connections of said parts the retracting and opposite movements are limited in length to the length of the limited movement of the convexity 12.

In Figure 6 the construction is basicly the same except that it is adapted for the regular type pen nib (1B), and is aimed to increase the compactness of the pen by lengthening the cover 18 and mounting thereunder certain features explained in relation to Figures 1 and 2. For instance, the cylinder 9A and tubular housing 5, which, in this instance, are firmly secured by friction against the inner wall of cover 18 or may be held there in place by other means, for instance, threads.

In Figures 1, 2 and 6 the filling mechanism has a relatively short rubber sac 15 mounted over one end of barrel 2 and adapted in cooperation with pipe 16 to pump ink in or out of the ink container within barrel 2. Cap 14 is screwed over the end of barrel 2 and, if there is no outside arrangement to compress sac 15, may be removed whenever manual pressure against sac 15 is to be applied.

From the drawings it is evident that the pen is adaptable for different types of fillers, for instance, the pipe 16 and sac 15 may be replaced by any suitable plunger type filling arrangement, or, as shown in Figure 5, an elongated rubber sac 15A may be adapted to wall the ink container and for a member of filling mechanism including a pressure bar 20 resting against inner groove 23 of barrel 2 and having press button 21 compressible through opening 22 at the end of barrel 2.

In Figure 5 the shut-off valve is basically the same as in Figures 1, 2 and 6, and may be adapted in this pen because it extends sideway. Further advantage of shown valve for mass production of this pen with different types of containers consists of said valve being "sacless," in other words, as comparingly illustrated in Figures 1, 2 5 and 6, said valve does not depend upon, for instance, the sac 15A (Fig. 5), nor any other sac that may or may not be adapted in the pen. In each shown instance the valve remains independent, separated and sealed from pen ink container by the upper section inner end of walls 7 of the feed duct channel and by the tubular band 7B of relatively soft, flexible, stretching and springy material mounted over the middle section of feed channel walls 7 and the valve seat and beyond the latter towards the inner end of said walls, and the seat is mounted in the feed channel and separated from the ink container by the upper section inner end of said walls 7. The band 7B, as shown, does not need to be and is not extended into the ink container and is not a part thereof. The press button 7A is mounted in an opening in the lower section of the pen over the tubular band 7B and the valve seat, and the opening and the button 7A are insulated and sealed from the ink and the ink container by the tubular band 7B and walls 7 of the feed channel. Thus the shut-off valve would shut off the ink container when the projection 9 slides over said valve, more specifically over its press button 7A (Fig. 1), and would release the container when button 7A assumes dependent position within elevation 8 (Figures 2, 5 and 6). While the valve construction as described and shown in Figures 1, 2, 5 and 6 is strictly within the scope of my U. S. Patent #2,098,528 and therefore will perform as explained therein and heretofore, it illustrates in present Figures 1, 2 and 5 certain practical simplifications for commercial manufacture as compared to Figure 6 and the drawings in the aforesaid patent. For instance, in Figures 1, 2 and 5 the inner end of pen section 2A is not extended to the inner end of pen feed 7, on the contrary, the latter extends into the barrel from within and relatively far beyond the inner end of pen section 2A. One end of band 7B is mounted over the inner end of the pen section 2A where the latter has its customary mounting seat. The band 7B is extended over the valve seat and beyond the latter to and over the seatless inner end of pen feed 7 where it is sealed adjacent to the ink container wall (barrel 2 in Figures 1 and 2, or the sac 15A in Figure 5). Such simplifications are evidently advantageous in practical manufacture, especially when a rubber sac may be adapted to wall the ink container while the shut-off valve is desired to remain independent, separated and sealed therefrom.

In Figures 1, 2, 5 and 6 a cylinder 13 is provided to conceal from outside the break of lines formed by slidable portion of the pen and barrel 2 when cover 18 is pulled forward. Cylinder 13 has relatively thin walls and has one end thereof stationary secured to the middle section of barrel 2 over projection therefrom which allows the other end of cylinder 13 to slide longitudinally over the outer wall of cover 18 (or extension thereof) when said cover is moved forward or backward, and cylinder 13 is slightly longer than the margin of said movement to shield aforesaid broken lines when cover 18 is fully moved forward, and the end of cylinder 13 is secured to the middle section of barrel 2 to allow room for mounting of cover 14 over the end of said barrel. Ordinarily, with certain types of filling arrangements, for instance illustrated in Figure 1, the pen barrel 2 and a portion of cover 18 covering said barrel, and cylinder 13 may be made of transparent material to allow ink visibility in the container. When reduction of general thickness of the pen is desired it may be necessary to make cover walls 18 and cylinder 13 of very thin metal evidently nontransparent. In such case the ink visibility may be preserved by providing opposite walls of cylinder 13 and desirable portion of cover 18 with a number of relatively small openings 24 (Fig. 6) through which transparent wall of container ink may be seen in the latter from outside if pen is held against light.

In Figures 7 and 8 the cooperating relation between cover 18 and point 1B and the shut-off mechanism is accomplished as follows: Cover 18 from position in Figure 7 is pulled forward. Eventually hold 29 will catch hold 28 and by that time the point 1B already will retract within cover 18. If the forward pull is continued the hold 29 will pull casing 26 forward by means of hold 28 of the casing until hold 30 of the casing will meet resistance of neck 10A. The pen then will assume position shown in Figure 8, in which position, as previously described, ink flow from container within barrel 10 is blocked from reaching passage 3B. When the motion of cover 18 is reversed it will eventually bring the mounting edges of rubber cap 6 against hold 28 of casing 26, by that time the nib 1B will already emerge from within cover 18. Continuation of backward movement of cover 18 will cause edges 6 to press against hold 28 of casing 26 forcing the latter backward to position shown in Figure 7 as soon as hold 29 will meet resistance of the other end of neck 10A, and in such position opening 26A to passage 3B will become exposed to ink in the container within barrel 10 which would allow free flow of said ink from the container to the nib 1B.

When pen is in closed position as illustrated in Figures 1 and 8, and the shut-off mechanisms lock the main supply of ink in the containers within barrel 2 (Fig. 10) or 10 (Fig. 8) there still remains little quantity of ink in the outer portions of feed ducts 3A (Fig. 1) or 3B (Fig. 8) or 3C (Fig. 6) when the pen shown in the latter also is brought into closed position corresponding to those shown in Figures 1 and 8. If left exposed to outside through opening 18A of cover 18 there is a possibility that this quantity of ink in the feed ducts may easily dry out if pen is not used for considerable length of time, or before it dries out may be shaken out through opening 18A, or may leak out even if pen is being carried in position where the opening 18A is down. To prevent said possibilities a closed nib-cover 6 is provided and is secured in such a manner that it moves simultaneously with cover 18 over barrel 2 in Figures 1, 2 and 6, or barrel 10 (Fig. 8). This is accomplished in Figures 1 and 2 through medium of upper end of tubular housing 5 forming extension of cover 18, and in Figure 6 through a separate member forced stationary or screwed into cover 18, and in Figures 7 and 8 through a medium forming an upper end of cover 18. Cover 6 is split into four (or more) petals (Figures 3 and 4), or may be made of splitable (under puncturing force) material capable of sealing itself after a puncturing instrument is removed therefrom. In the first instance the petals of cover 6 may be made of soft, flexible and resilient material, for instance, soft rubber. The object is to allow points 1 or 1B and their housings to pass frictionally through closed end of cover 6 when it is moved against said points, and to allow said cover 6 to resume its closed position over the nibs and feed ducts 3A, 3C and 3B when the nibs and their housings are retracted therefrom.

It has been found that a pen constructed as described may be carried safely filled with ink with opening 18A down. Even in such position and even shaken in such position the pen did not show any ink leakage through opening 18A. In Figures 1 and 2 a pen clip 17 is shown secured in a manner allowing pen to be carried with opening 18A up and said clip 17 may be safely secured to cap 14 in a manner allowing the pen to be carried with opening 18A down. Specified material for cover 6 is also adapted to allow nibs 1 or 1B a direct contact against said cover without damage to the nibs. The advantage of such direct contact may be observed on an ordinary pen filled with ink when its dried nib-tip is touched with a finger or a soft rubber. Said nib will show ink instantly after such contact.

In this pen, contact with cover 6 will cause the nib-tip to become moist from ink in adjacent feed ducts 3A, 3C or 3B just before the nib is completely emerged for writing thus contributing to easier start. Small quantity of ink accumulating on the inner walls of cover 6 will further contribute to wettening of the nib when the latter passes therethrough.

In fountain pens either with stylus or regular pen points there usually is an air vent extended perpendicularly from middle section of the feed passage (duct) and thus located relatively far from the nib-tip, for instance, in Figures 6, 7 and 8 is the vent 1C in the nib 1B. It is a general rule in filling a pen with self contained filling mechanism to submerge the nib into an ink bottle so that the air vent is covered by ink. In this pen it may be accomplished by allowing air vent 1C to come out beyond outer edges of opening 18A when the pen is in open position as shown in Figures 6 and 7, or by providing an elongated deck 3 (Figures 1 and 2) one end of which emerges with the point 1 beyond the outer edges of opening 18A when the pen is open as shown in Figure 2. Deck 3 has an enclosed air duct 3A separated from feed duct and extended longitudinally from the air vent to the outer end of deck 3 towards nib 1 and relatively near its tip.

Soft rubber pads 4 in Figures 1, 2 and 6 are adapted to wipe off ink from barrel 2 if the ink gets under the cover 18 while pen is being filled. In practical manufacture it has been found, however, that if vent 1C or deck 3 with air duct 3A are allowed to emerge beyond opening 18A when pen is being filled, the pads 4 may be omitted for economy reasons without jeopardizing safety or performance.

The smallest of regular type nibs still must be relatively wide for self-support when mounted in the regular manner in a pen section or similar receptacle as shown in Figures 6, 7 and 8 where diameter of opening 18A depends upon the width of emerging nib. When regular type nib is used it may be desirable for general compactness to decrease to a minimum the diameter of opening 18A. To accomplish such decrease without endangering the strength of regular type nib a relatively narrow tubular reinforcement 35 (Fig. 13) may be provided and adapted as reduced housing for nib 1B and actually being an extended pen section secured at the end of the pen barrel. The nib receiving end of housing 35 is open and may be shovel shaped and may be equipped at the edges thereof with point-grasping tooth-like grips 36 forming a slot for reduced nib 1B to pass thereunder, and are adapted to hold and support the exposed middle section of the nib 1B while the latter has its inner end secured within the enclosed section of the housing 35. The latter may be made of thin metal unaffected by ink, for instance of 14K gold or stainless steel. A pen feed with feed duct 3C is extended into housing 35 under and along nib 1B, and the pen feed may be of conventional type or, for instance, shaped substantially the same as illustrated housing 35 except of being of smaller diameter to allow its mounting within said housing 35, and, of course, less grips 36. The latter may be eliminated also in the housing 35 if the nib is shoved farther into said housing and if the edges of relatively flat nib assume longitudinally relatively diametrical position within the outer end of housing 35 against inner walls of the latter in which case said walls would act as grips against the sides of the split nib length therebetween.

To write with this pen at high altitude without chance for ink to leak out from the pen ink container means may be provided to depress shut-off valve when retractable nib (1B or 1) is projected beyond slidable cover 18 fractionally in relation to full projectability of said nib, said means comprising an arrangement within the pen to keep the valve shut when the nib is so projected, and said means may consist, for instance, of aforesaid projections 9A (Fig. 6) or 9 (Fig. 1) originally adapted to depress button 7A by sliding thereover, and, as can be detected from the drawings, adequate length of projections 9A or 9 would continue to depress button 7A after nibs 1B or 1 are projected fractionally in relation to their full projectability beyond cover 18. Writing under described conditions would be possible as long as there is relatively small quantity of ink in the outer portions of feed ducts 3A, 3B and 3C. To prolong the writing time at high altitudes with reasonable and controllable security dependent upon quantity of ink flow from pen ink container means may be provided to release the shut-off valve gradually while the retractable nib (1B or 1) is being projected beyond the slidable cover 18 said means comprising an arrangement within the pen for the aforesaid purpose, and which means may consist, for instance, of slight enlargement of the inner diameter of upper end of valve depressing cylindrical projection 9A (Fig. 6). From said end down the inner diameter of projection 9A may be gradually reduced and eventually brought to diameter illustrated in Figure 6. Thus while nib 1B already may be emerged for writing the extend of such emerging would regulate the shut-off valve and its button 7A pressure against feed duct thereby regulating the quantity of ink emerging from the pen ink container. This is being accomplished by means of cover 18 and its extension: the projection 9A, in other words by the inner walls of the cover sectionally projected to the valve casing (barrel 2) and sectionally elevated therefrom. In some instances it may be desirable to have the pen close automatically. It may be accomplished through a medium of an outwardly resilient spring 31 (Figures 9, 10 and 12) secured over barrel 2 against movable portion of the pen, for instance, cover 18 or extension thereof, and manually releasable catch 32 secured by medium of outwardly resilient supporting spring 32A to one (10) of the slidable members and engaged against an opening 13A in the other slidable member (13) and adapted to hold cover 18 in dependent position against resiliency of spring 31. If the pen is equipped with gradually unlocking shut-off mechanism means may be provided to arrest slidable cover 18 in different dependent positions said means comprising a suitable arrangement within the pen consisting, for instance, of a number of openings (13A, 13B and 13C) for the catch 32 to allow the latter to hold cover 18 in different dependent positions against resiliency of spring 31, each position corresponding to desired degree of the point extension for writing and the extend of unlocking of ink-flow from pen ink container by the shut-off mechanism. When catch 32 is pushed inwardly from one of its openings said catch slides in a groove 33 which may be provided in the inner wall of cylinder 13. To prevent catch 32 from sticking, for instance, in opening 13C when it is wanted to have it placed in opening 13A means may be provided to neutralize certain of the cover arresting means while allowing other similarly adapted arresting means to effect seizure of the cover in certain dependent positions which means may comprise a manually adjustable member consisting, for instance, of a ring 34 (Figures 9, 10, 11 and 12) movably secured in an outside groove of cylinder 13 and equipped with number of openings (34A, 34B and 34C) said openings adapted to assume respectively a dependent position over corresponding openings 13A, 13B and 13C in cylinder 13, and the openings 34A, 34B and 34C in the ring 34 are consequently spiral (Fig. 11) while the openings 13A, 13B and 13C in cylinder 13 are consequently longitudinally. Such arrangement is adapted to allow disengaged opening (for instance, in Figure 9, openings 34B and 34C) of ring 34 to misfit disengaged opening (openings 13B and 13C) in cylinder 13 when engaged opening 34A of ring 34 assumes dependent position over its corresponding opening 13A of cylinder 13. Thus, for instance, if the pen owner plans a trip in an aeroplane he may turn ring 34 so that its opening 34B will assume position over opening 13B of cylinder 13. Then, when the pen opens to write at high altitude, the catch 32 will miss openings 13C and 13A because they are covered with solid inner wall of ring 34, and, being made in relatively thin wall of cylinder 13, when closed from outside form insufficient concaves to capture the catch 32, especially if its supporting spring 32A is weaker than spring 31, and if the loose end of catch 32 is rounded. But the catch 32 will stick in opening 13B which provides a through opening in cooperation with opening 34B, which would cause cover 18 to be arrested and held in such position that the nib would be partially emerged and available for writing while the shut-off mechanism slightly opens the feed duct to allow only relatively small quantity of ink to pass therethrough from the pen ink container. After the writing is over a pressure of a finger against catch 32 will force the latter into groove 33 releasing spring 31 which, in turn, will force the pen to close automatically. If flying is anticipated at still higher altitude, for instance, in stratosphere on a strato-liner, ring 34 may be turned where opening 34C will assume position over opening 13C. Then, when the pen is opened for writing, the catch 32 will stick only in opening 13C and hold cover 18 in position where the nib is available for writing but the pen ink container continues to remain locked by the shut-off mechanism so that only a relatively small quantity of ink in the upper portion of feed duct is available for writing. When no travels at high altitudes are planned ring 34 may be set to allow opening 34A to assume position over opening 13A, so that the catch 32 will stick only therein when pen is open for writing and will hold cover 18 in position where the nib is fully emerged and the shut-off mechanism completely unlocks the feed duct from the pen ink container.

Described gradual locking and unlocking of the feed duct may be termed "longitudinal" as dependent upon longitudinal force moving cover 18 forward and backward. Similar gradual action may be achieved, of course, by a twisting force against cover 18 when the pen is open (Figures 2 and 6) and valve button 7A is under walls of circular elevation 8 by simply shaping the inner diameter of said walls eccentrically, or by breaking said circular elevation (groove) into a number of smaller noncircular grooves each one being of different depth. Naturally, the entire forward and backward movement of cover 18 may be made dependent upon a twisting force by means, for instance, of regular type inner threads similar to ones that unscrew a slidable cap in a regular pen. If (when twisting method is adapted) it is desirable to regulate aforesaid gradual action and close the pen automatically the basic principles of mechanism referred to in Figures 9, 10, 11 and 12 may be adapted with but minor changes. For instance, spring 31 may be replaced by one that unwinds watch-like. Openings 13A, 13B and 13C instead of being longitudinally respective in cylinder 13, may be made cylindrically or spirally respective therein, and openings 34A, 34B and 34C in the ring 34 may be replaced either with one opening corresponding with cylindrically located openings 13A, 13B and 13C, or the ring 34 receiving outer groove in cylinder 13 may be made wider than ring 34 to allow the latter to be moved longitudinally as well as circularly to permit an opening or openings in said ring 34 to assume dependent position over desired opening in cylinder 13 when openings 13A, 13B and 13C therein are spirally respective and a disengaged opening or openings of one member assume dependent position against solid wall of the other member.

While specific embodiments of this invention are herein shown and described, it is and will be clearly understood, of course, that variations within the scope of accompanying claims may be resorted to without jeopardizing this patent protection, and that the various details of constructions may be varied through a wide range without departing from the principles of this invention as described in one or more of following claims, and it is therefore not the purpose to limit the patent granted hereon otherwise than necessitated by the said scope of the appended claims.

I claim as my invention:

1. A fountain pen comprising an elongated barrel, an ink container within the barrel, a nib in a duct housing secured to the barrel with sideway extending shut-off valve, a slidable cover engaged over the valve, the inner wall of the cover having an elevation to allow room therewithin for valve release, and a projection adjacent to said elevation adapted as means to depress the valve by sliding thereover when the valve assumes dependent positions thereunder.

2. A fountain pen comprising an elongated barrel, an ink container within the barrel, a retractable nib in a duct housing secured to the barrel, a slidable pen cover with a roof of relatively soft, flexible and resilient material which comes in direct and frictional contact against the nib when the latter is in advance movement, and said roof is secured within and with the slidable cover, and is divided into a number of petals which are relatively adjacent in closed position over the nib when the latter is retracted, and assume relatively longitudinal position within the cover against the nib and duct-housing when the latter are projected frictionally therethrough.

3. A fountain pen comprising an elongated barrel, an ink container within the barrel, a retractable nib in a duct housing secured to the barrel, a slidable pen cover with a roof of relatively soft and puncture self-sealing material which comes in direct and frictional contact against the nib when latter is being advanced, and which is secured with the slidable cover and forms solid roof over the nib when latter is retracted.

4. In a self-filling fountain pen with a pen cover slidable over the pen barrel and air duct and limited in its forward and backward movements an air-duct-longitudinal-insulator comprising a tubular deck over a retractable pen section with a nib therein which deck is secured to and forms a part of said section over a length of the pen nib, feed-duct, air-vent and air-duct the latter projecting from the air-vent to an opening from under the outer end of the deck which extends to a middle section of the nib, and, when the cover is slid to its backward limit, the outer end of the deck extends together with the nib beyond an open end of the cover to insulate the air-duct from inner wall of the cover.

5. A fountain pen comprising an elongated barrel, an ink container within the barrel, a pen cover slidable over the barrel and having a relatively small opening at one end thereof, a relatively narrow retractable nib of regular type secured to the pen barrel and having its split section reinforced by means which are independent from the pen feed and the casing of the cover-opening and consist of a tubular neck of relatively hard material secured to the pen section and having relatively thin walls at one end thereof which is open and is of relatively small diameter to allow its passage through the opening in the cover, and a relatively flat nib-length including a portion of its split section mounted longitudinally in relatively diametrical position within and in relation to the relatively tubular walls of the outer end of the neck which walls form grips against the sides of the nib-length there-between and a duct extended longitudinally between the nib and the opposite wall of the neck.

6. A fountain pen comprising an elongated barrel, an ink container within the barrel, a pen section with a pen nib in one end thereof and the other end mounted into one end of the barrel, a feed-duct in a pen feed secured in the pen section, and the feed and the duct are extended into the barrel relatively far beyond the inner end of the pen section, and a middle portion of so extended duct is adapted for a valve seat of a sideway extending shut-off valve with a press button secured in a side opening of the barrel over the valve seat and compressible by a slidable cover, a rubber-like tubular housing secured to the inner end of the pen section and extended over the valve seat and the inner end of the feed and duct, which end is in cooperating relation with rubber-like tubular housing mounted thereover which seals the press button from the pen ink container and separates the valve seat therefrom.

7. As set forth in claim 6 and a rubber-like sac secured within the pen barrel and having the closed and relatively longer end adapted to wall the pen ink container, and the open and relatively shorter end of the sac mounted over the inner end of the extended feed and duct and over the valve seat, and the inner wall of the sac over said valve seat does not face the pen ink container but is separated therefrom by the inner end of the duct and walls thereof.

8. In a fountain pen a plurality of slidable tubular nib covers engaged over retractable pen nib and duct housing and comprising an inner cover which is secured within and with an outer cover and includes in combination a number of petals arranged to roof the nib when latter is retracted and thereunder and assume a dependent position longitudinally in relation to and fully under the outer cover and over the duct-housing when latter is advanced and projects between said petals, and the outer cover shields said petals when they are in either position.

9. In a fountain pen with a retractable nib, a plural nib covering comprising a plurality of slidable covers which are tubular, and are mounted consecutively in telescopical relationship, and are secured to each other, an inner cover with a convertible roof, an outer cover thereover adapted to insulate said convertible roof when the latter is engaged and disengaged.

10. In a fountain pen with a retractable nib a sideway extending shut-off valve, a slidable pen cover, a projection extended from the cover and adapted to depress the valve by sliding thereover when the cover is engaged, and a section of the nib is retracted, and the writing end of the nib extends beyond the outer end of the cover.

11. In a fountain pen with a sideway extending shut-off valve a slidable valve compressor comprising contactual points which are at relatively variant and relatively invariable elevations and are successively descendable against the valve in a series of slides when the compressor is engaged.

12. A fountain pen structure comprising a pen barrel, a slidable cover secured over one end thereof and adapted for a rectractable nib, a tubular sleeve which is secured over and to a middle section of the barrel and does not extend to the end thereof to allow room for mounting a stationary cover which is removably secured over said free end of the barrel and is adapted to cover a section of a pen filling mechanism extending beyond said end of the barrel thereunder, and when this cover is so mounted the inner end thereof is relatively adjacent to the inner end of the sleeve, and the other end of the latter is in telescopical relationship with the inner end and section of the slidable cover, and the sleeve is adapted as an apron to dim pen exposure thereunder.

13. In a fountain pen with a slidable cover and a retractable duct housing thereunder an annulation of relatively soft and sealing material secured under the cover and over the housing and adapted as washer to check and wipe ink penetration therebeyond.

14. In a pen structure comprising slidable relationships a sideway extending shut-off valve under a slidable cover, the latter engaged over a retractable duct-housing secured to a pen barrel with the valve casing over the middle section of the duct, the duct-housing, barrel and valve as a unit in slidable relationship with the cover, a manually operated and inwardly releasable and relatively outwardly resilient catch secured to a retractable enclosed member and engageable against a relatively small and local opening in the outer corresponding slidable member to hold said members in relatively dependent position.

15. In a pen structure comprising slidable relationships a manually operated, and inwardly releasable, and relatively outwardly resilient catch secured to a retractable enclosed member and engageable against a plurality of longitudinally arranged and relatively small and local openings in the outer corresponding slidable member to hold said members in relatively different dependent positions.

16. The same as in claim 14 and a forwardly resilient spiral spring which is mounted over the barrel and has its ends secured respectively against relatively perpendicularly extending edges of the corresponding members to engage the latter in their relative movements automatically when the catch is released.

17. The same as in claim 15 and a forwardly resilient and spiral spring which is mounted over a retractable member under a slidable cover, and the ends of the spring are secured respectively against relatively perpendicularly extending edges of the members which are in sliding relationship to engage said members automatically when the catch is released.

18. The same as in claim 15 and a forwardly resilient and spiral spring which is mounted over a retractable member under a slidable cover, and the ends of the spring are secured respectively against relatively perpendicularly extending edges of the members which are in sliding relationship to engage said members automatically when the catch is released, and a tubular sleeve movably mounted over the openings, an aperture in the sleeve adapted to assume a dependent position over an opening in the correspondent member thereunder when a disengaged opening in the latter faces a solid section of the sleeve wall.

ANATOL N. ANDREWS.